(No Model.)
A. M. POWELL.
METAL TURNING LATHE.
No. 351,711.   Patented Oct. 26, 1886.
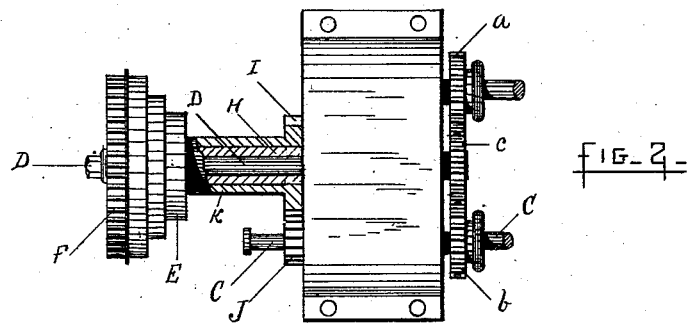
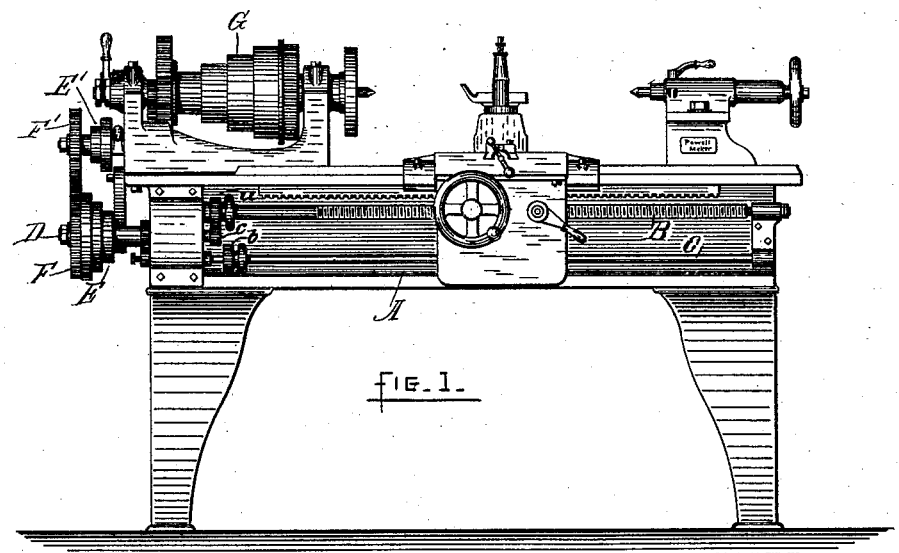
Witnesses:
Henry Heis
N. C. Steere.
Inventor:
A. M. Powell
By Rufus B. Fowler
atty.

UNITED STATES PATENT OFFICE.

ALBERT M. POWELL, OF WORCESTER, MASSACHUSETTS.

METAL-TURNING LATHE.

SPECIFICATION forming part of Letters Patent No. 351,711, dated October 26, 1886.

Application filed March 2, 1886. Serial No. 193,755. (No model.)

*To all whom it may concern:*

Be it known that I, ALBERT M. POWELL, a citizen of the United States, residing at Worcester, in the county of Worcester and State of Massachusetts, have invented a new and useful Improvement in Metal-Turning Lathes, of which the following is a specification, reference being had to the accompanying drawings, in which—

Figure 1 represents a front elevation of a metal-turning lathe, and Fig. 2 is a detached and enlarged view of that part of the lathe embodying my invention.

Similar letters refer to similar parts in both views.

My invention relates to that part of the lathe known as the "feeding mechanism;" and it consists in providing means whereby the leading-screw and feed-rod may both be driven positively and with a wide range of variation in speed, as hereinafter described, and specifically set forth in the claims.

A denotes the bed of the lathe; B, the leading-screw, and C the feed-rod, both held in bearings attached to the bed, and being constructed and operating as is common in machines of this class.

Journaled in bearings on the bed A and between the screw B and rod C, I place an intermediate shaft, D, and upon a fixed bearing, H, attached to the bed of the lathe and concentric with the shaft D, I place a cone-pulley, E, having a gear attached to its hub K, the cone-pulley receiving motion from a cone-pulley, E', driven by the live-spindle G, through connecting mechanism, not shown in the drawings, but common in lathes of this class. Upon the intermediate shaft, D, I also attach a gear, F, driven by the gear F' through an intermediate gear, which in turning-lathes is generally adjustable in its position, in order to allow the gears F and F' to be varied in size, and thereby change the speed of the driven shaft. Upon the inner end of the intermediate shaft, D, I attach a pinion, c, and upon the leading-screw B and feed-rod C, I place the sliding pinions a and b, connected with the screw B and rod C by splines.

In the drawings, Fig. 1, the pinion a is shown in mesh with the driving-pinion c, and the pinion b disconnected therefrom, the rotation of the shaft D through the gears F and F', when the lathe is started, driving the leading-screw B. When desired, the pinion a may be similarly disconnected and the pinion b made to engage the driving-pinion c, thereby operating the feed-rod C. By the change of the gears F and F' a great variation in the speed of both the screw B and rod C may be readily obtained.

Upon the outer end of the feed-rod C, I place a sliding pinion, J, having a spline-connection with the feed-rod and meshing with the gear I on the hub of the pulley E, thereby allowing the feed-rod to be driven through the cone-pulleys E and E' and gears I and J by disconnecting the pinions a and b from the intermediate c.

When it is desired to drive either the feed-rod or leading-screw through the gearing F a b c, the pinion J may be slid on the feed-rod and disconnected from the gear I.

What I claim as my invention, and desire to secure by Letters Patent, is—

1. The combination, with the leading-screw and feed-rod of a turning-lathe, of an intermediate shaft operated through connecting mechanism by the live-spindle, said intermediate shaft having a gear adapted to engage gears on either the leading-screw or the feed-rod, as may be required, as described.

2. The combination, with the leading-screw and feed-rod of a turning-lathe, of an intermediate shaft journaled in bearings between said screw and feed-rod, and receiving rotary motion from the live-spindle through a system of gears variable in size, and commonly known as "change-gears," said intermediate shaft having a gear adapted to engage gears on either the leading-screw or feed-rod, as described.

3. The combination, with the leading-screw and feed-rod of a turning-lathe, of sliding pinions having a spline connection with said screw and rod, and an actuating-gear driven through connecting mechanism with the live-spindle and adapted to engage either of the pinions on said screw or rod, as described.

4. The combination, with the feed-rod of a metal-turning lathe, having a pinion capable of sliding on said rod and connected therewith by a spline, of a pulley running on a fixed bearing attached to the bed of the lathe and carrying an attached gear engaging the sliding pinion on the feed-rod, said pulley being driven by the live-spindle of the lathe through connecting mechanism, as described.

Witnesses:     ALBERT M. POWELL.

RUFUS B. FOWLER,
H. M. FOWLER.